United States Patent

[11] 3,612,690

[72] Inventor Robert C. Staats
 Fridley, Minn.
[21] Appl. No. 53,150
[22] Filed July 8, 1970
[45] Patented Oct. 12, 1971
[73] Assignee The United States of America

[54] LASER GYRO DITHER CIRCUIT
 3 Claims, 2 Drawing Figs.
[52] U.S. Cl. .................................................. 356/106 LR
[51] Int. Cl. ........................................................ G01b 9/02
[50] Field of Search ........................................... 356/106
 LR; 331/94.5

[56] References Cited
 UNITED STATES PATENTS
 3,390,606 7/1968 Podgorski.................... 356/106 LR Primary Examiner—Ronald L. Wibert
Assistant Examiner—V. P. McGraw
Attorneys—Charles K. Wright, Jr., William G. Gapcynski, Lawrence A. Neureither, Leonard Flank, Aubrey J. Dunn and Jack W. Voigt ABSTRACT: Frequency coupling of counterrotating beams in a gaseous laser gyro is prevented by varying the discharge current in the laser. The circuit is for use with a laser having a common cathode and two anodes, and includes a source of random signals, such as a noise diode generator. The signals from the generator are amplified and limited to give a variable frequency and pulse-width rectangular wave. This wave, in its original form, and in a phase-shifted form, controls a push-pull amplifier. The controlled elements (such as transistors) in the push-pull amplifier are in series with the laser anodes. Thus, a random rectangular wave is effectably applied to the discharge current through each anode.

PATENTED OCT 12 1971 3,612,690
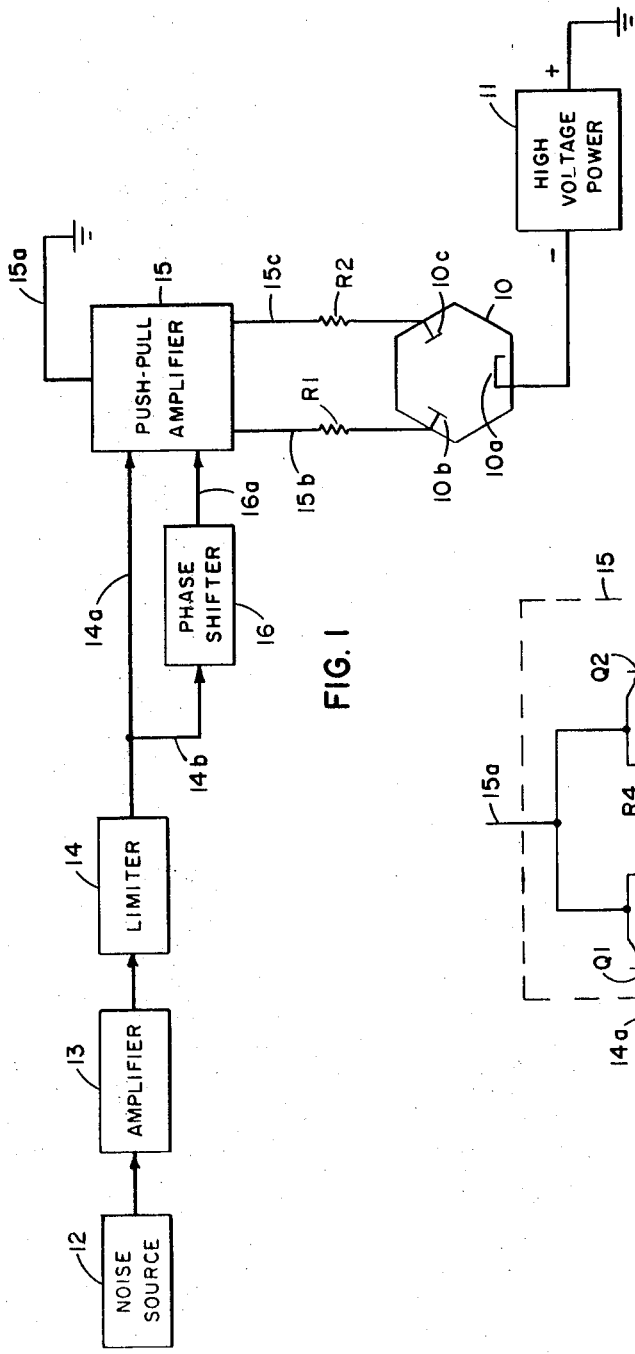
Robert C. Staats,
INVENTOR.

LASER GYRO DITHER CIRCUIT

BACKGROUND OF THE INVENTION

The problem of frequency coupling of two counterrotating beams in a laser gyro is a problem well known in the art. Various ways have been proposed for eliminating this problem, such as the systems shown in U.S. Pat. Nos. 3,373,650, 3,467,472, and 3,468,608. The first two of these patents teach introduction of mechanical movements to the laser or the inclusion of a Faraday medium in the optical paths of the lasers. The last-mentioned patent teaches a rotating transparent disk in the laser optical paths. All of these methods have obvious disadvantages. In particular, mechanical movement of the lasers would be intolerable for a strapped-down gyro system. The introduction of a Faraday medium in the optical path presents mechanical problems and optical alignment problems. Moreover, the introduction of mechanically moveable elements in a laser gyro limits accelerations to which the gyro can be subjected. These acceleration limits would obviously also be present in the last-mentioned patent. The instant invention, because of its nature, is able to overcome these drawbacks.

SUMMARY OF THE INVENTION

This invention comprises an electronic circuit capable of varying the discharge current of a gas laser in a random manner. The circuit includes an electronic noise source, the output of which is amplified and limited to give a rectangular wave randomly variable in boost frequency and pulse-width. This wave and a phase-shifted version thereof control the two sides of a push-pull amplifier. The laser has two anodes connected to the push-pull amplifier. Thus, the current from each anode is varied in a random manner, although cathode current of the laser remains constant.

BRIEF DESCRIPTION OF THE DRAWINGS

FIG. 1 of the drawings is a schematic diagram of the invention.

FIG. 2 of the drawings is a detailed schematic showing of the contents of the push-pull amplifier of FIG. 1.

DESCRIPTION OF THE PREFERRED EMBODIMENT

As can be seen in the drawing, the invention is connected to a gas laser 10, of the type as shown in U.S. Pat. No. 3,390,606, of July 2, 1968. This laser includes cathode 10a and anodes 10b and 10c. Cathode 10a is connected to the negative side of high-voltage power supply 11, with a positive side of the power supply grounded. Numeral 12 designates the noise source. This source may be a noise diode, a white noise source, etc. This source provides noise of a random nature. The output of 12 is fed to amplifier 13 with the output of amplifier 13 fed to limiter 14. The output of limiter 14 is a rectangular wave having variable frequency and pulse-width. The rectangular wave is fed through line 14a to push-pull amplifier 15 and through line 14b to phase shifter 16. The output of phase shifter 16 is fed on line 16a to push-pull amplifier 15.

The contents of push-pull amplifier 15 are shown in detail in FIG. 2. As can be seen, this amplifier includes transistors Q1 and Q2 with lines 14a and 16a respectively connected to the bases of these transistors. Resistor R3 is connected from the emitter to the collector of transistor Q1 and resistor R4 is connected from the emitter to the collector of resistor Q2. The emitters of the transistors are both connected to line 15a and the collectors thereof are connected to lines 15b and 15c. Referring again to FIG. 1 it can be seen that line 15a is grounded and lines 15b and 15c respectively connect to resistors R1 and R2, with the other end of resistors R1 and R2 connected to anodes 10b and 10c. A gaseous discharge device, such as a laser, has a volt-ampere characteristic with a negative slope over a portion of its operating region. Hence, the device, when operated in this region, presents a negative incremental resistance to the external circuit to which it is connected. If the magnitude of the external driving source resistance is less than the negative resistance of the laser, sustained oscillations of the discharge gas plasma will occur. When this occurs the laser is useless in a gyro application. This undesirable oscillation is prevented by adding external resistances R1 and R2, of magnitude greater than the incremental negative resistance of the laser. In addition, these resistors also limit the maximum value of current in each laser leg to a safe value, in case either transistors Q1, Q2 or both, are driven into saturation. Resistance R3, in conjunction with resistor R1, forms a voltage divider which limits the maximum voltage at the collector of Q1 to less than its collectro-emitter breakdown value. If resistor R3 were not present, accidental opening of the base lead to Q1 or driving Q1 into cutoff would cause the collector potential of Q1 to approach the magnitude of the high-voltage supply. This would destroy the transistor unless its $V_{ceo}$ rating were equal to that of the high-voltage supply. In addition R3 also establishes a lower limit to the laser discharge current in leg a so that if Q1 is driven into cutoff, the gas discharge arc will not be extinguished. Resistor R4 in conjunction with resistor R2 performs a similar function for laser leg b. Typical values of the resistances are: R1=R2=51,000 ohms, and R3=R4=39,000 ohms. With push-pull amplifier 15 connected as shown, transistors Q1 and Q2 will present effectively varying impedances to ground. The anode current from 10b and 10c will thus vary, although the total current will remain constant. The variations in anode current will prevent frequency coupling of the two counterrotating laser beams.

While a particular body of the invention has been shown and described, other embodiments may be obvious to one skilled in the art, in light of this disclosure. For example, the transistors of push-pull amplifier 15 may be replaced by light-emitting devices illuminating photoresistors, with the light-emitting devices powered by lines 14a and 16a, or magnetic amplifiers may be substituted for transistors Q1 and Q2. In any event, a random variation of current in lines 15b and 15c is established. This variation would normally be of such a magnitude as to appear as a rectangular wave ripple on top of the normal DC current provided to lines 15b and 15c by high-voltage power source 11.

I claim:

1. A circuit for preventing frequency coupling in a gaseous ring laser having counterrotating beams, in which the laser is supplied discharge current from a power supply having at least two terminals of a first polarity and at least one terminal of a second polarity opposite to said first polarity, wherein said laser has at least two electrodes adapted to be connected to said first two terminals and one electrode connected to said one terminal, the invention comprising:
   a source of random electrical signals,
   wave-shaping means connected to said source for processing said signals into first and second rectangular output waves;
   current-controlling means including first and second current-controlling devices each having a control terminal and first and second power terminals; said power terminals of said current-controlling devices being connected between said two terminals of said power supply and said two electrodes of said laser, said control terminals being connected to said wave-shaping means, whereby said first and second rectangular output waves control current through said first and second current-controlling devices.

2. The circuit as set forth in claim 1 in which each of said current-controlling devices is a transistor, and said control terminals are the bases of said transistors.

3. The circuit as set forth in claim 2 further including a respective resistor connected between the emitter and collector of each of said transistors.